(12) United States Patent
Garbow et al.

(10) Patent No.: US 7,543,330 B2
(45) Date of Patent: Jun. 2, 2009

(54) METHOD AND APPARATUS FOR GOVERNING THE TRANSFER OF PHYSIOLOGICAL AND EMOTIONAL USER DATA

(75) Inventors: Zachary Adam Garbow, Rochester, MN (US); Robert Hart Hamlin, Mantorville, MN (US); Emuejevoke Jane-Frances Sanomi-Fleming, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/821,159

(22) Filed: Apr. 8, 2004

(65) Prior Publication Data

US 2006/0036751 A1 Feb. 16, 2006

(51) Int. Cl.
*G06F 15/16* (2006.01)
(52) U.S. Cl. .................... 726/2; 726/3; 726/11; 706/12; 706/45; 600/300; 709/229
(58) Field of Classification Search ................. 709/229; 726/11, 2, 3
See application file for complete search history.

(56) References Cited

U.S. PATENT DOCUMENTS

| | | | | |
|---|---|---|---|---|
| 5,535,063 A * | 7/1996 | Lamming | ....................... | 360/4 |
| 5,918,222 A * | 6/1999 | Fukui et al. | .................... | 707/1 |
| 6,160,986 A * | 12/2000 | Gabai et al. | ................. | 434/308 |
| 6,339,774 B1 * | 1/2002 | Nakayama et al. | ............ | 707/10 |
| 6,400,996 B1 * | 6/2002 | Hoffberg et al. | .............. | 700/83 |
| 6,605,038 B1 * | 8/2003 | Teller et al. | .................. | 600/300 |
| 6,640,145 B2 * | 10/2003 | Hoffberg et al. | .............. | 700/83 |
| 6,747,675 B1 * | 6/2004 | Abbott et al. | ................ | 715/740 |
| 7,046,263 B1 * | 5/2006 | Abbott et al. | ................ | 715/740 |
| 2002/0011958 A1 * | 1/2002 | Ogawa et al. | ................ | 343/761 |
| 2002/0151992 A1 * | 10/2002 | Hoffberg et al. | .............. | 700/83 |
| 2002/0183646 A1 * | 12/2002 | Stivoric et al. | .............. | 600/549 |
| 2004/0259494 A1 * | 12/2004 | Mazar | ........................... | 455/1 |

FOREIGN PATENT DOCUMENTS

| | | |
|---|---|---|
| JP | 200134410 A2 | 9/2001 |
| JP | 2001034410 | 9/2001 |
| JP | 200234936 A2 | 5/2002 |
| JP | 2002034936 | 5/2002 |
| JP | 2003115880 A2 | 4/2003 |
| JP | 2003319913 | 11/2003 |
| JP | 2003319913 A2 | 11/2003 |
| WO | 0203215 A1 | 1/2002 |
| WO | 2002003215 A1 | 10/2002 |

* cited by examiner

*Primary Examiner*—Kambiz Zand
*Assistant Examiner*—Yonas Bayou
(74) *Attorney, Agent, or Firm*—Patterson & Sheridan, LLP

(57) ABSTRACT

Methods, apparatus and articles of manufacture are provided for governing the transfer of data characterizing a user's behavior, physiological parameters and/or psychological parameters. One embodiment provides a method of handling a request, from a requesting application, for emotion data characterizing an emotional state of a user. A firewall ruleset defining rules governing the transfer of the emotion data to requesting applications is accessed to determine whether to provide the emotion data the requesting application. The request is denied if the firewall ruleset rules are not satisfied.

10 Claims, 4 Drawing Sheets

METHOD AND APPARATUS FOR GOVERNING THE TRANSFER OF PHYSIOLOGICAL AND EMOTIONAL USER DATA

BACKGROUND OF THE INVENTION

1. Field of the Invention

The present invention generally relates to a data processing and, more particularly, to governing the transfer of data characterizing a user's behavior, physiological parameters and/or psychological parameters.

2. Description of the Related Art

Generally, users view computers as relatively passive machines having a low level of initiative and merely responding to user requests and input. However, more recently, significant attention has been given to enhancing human-computer interaction (HCI). In particular, engineers and scientists seek to capitalize off of basic human attributes, such as voice, gaze, gesture and emotional state, in order to improve HCI. The ability of a device to detect and respond to human emotions is known as "affective Computing." For example, researchers at International Business Machines Corporation have measured heart rate, temperature, galvanic skin response and minute body movements of test subjects and then matched those measurements with emotional states, such as happiness, surprise, anger, fear, sadness and disgust. The researchers contemplate facilitating data acquisition by strategic placement of a variety of sensors in different locations or devices such as an office chair, keyboard, mouse, telephone grip. Over time, a computer can learn about a user's personality, emotions, likes and dislikes and even adapt itself accordingly. For example, depending upon a user's emotional state (e.g., tired, anxious or hurried) a computer may slow down or speed up the presentation of information. It is also possible that a computer configured for education may adapt its teaching style according its determination of a student's aptitude for learning.

However, while computers have the ability to determine users' emotions, users will certainly be adverse to the indiscriminate and uncontrolled distribution of raw mood data (i.e., raw data capable of being used to characterize a user's mood, such as heart rate, temperature, galvanic skin response, etc.) and/or processed information indicating the users' moods and/or emotions. Consider, for example, a telephone conference between two business partners. Such a medium of exchange will only allow the business partners to gauge the other's emotional state to a limited degree according to obvious voice inflections. With the current technologies described above, a more complete emotional profile for either or both of the partners may be determined and made available to the other partner. Consider another example in which users are engaged in online gaming (e.g. online poker). A player (human or computer) who is allowed unauthorized access to another player's emotions has a substantial advantage. Consider another example in which investigators perform unauthorized polygraphs via a communications network. Thus, technologies harvesting and/or processing human emotions can result in substantial intrusions to individuals' privacy and are likely to be abused in a variety of ways.

Therefore, there is a need for methods and systems giving users control over the distribution of their computer-captured emotions.

SUMMARY OF THE INVENTION

The present invention generally provides methods, apparatus and articles of manufacture for governing the transfer of data characterizing a user's behavior, physiological parameters and/or psychological parameters.

One embodiment provides a method of handling a request, from a requesting application, for emotion data characterizing an emotional state of a user. A firewall ruleset defining rules governing the transfer of the emotion data to requesting applications is accessed to determine whether to provide the emotion data to the requesting application. The request is denied if the firewall ruleset rules are not satisfied.

Another embodiment provides a computer readable medium containing a program which, when executed, performs an operation including receiving, from a requesting application, a request for data selected from: (i) emotion data characterizing an emotional state of a user; (ii) physiological data of the user; and (iii) a combination of the emotion data and physiological data. A firewall ruleset defining rules governing the transfer of the data to requesting applications is accessed to determine whether to provide the data to the requesting application. The request is denied if the firewall ruleset rules are not satisfied.

Yet another embodiment provides a computer including a source of emotion data characterizing an emotional state of a user and an emotion firewall. The emotion firewall is configured with an application programming interface defining a protocol for requesting the emotion data by applications; and a ruleset defining rules governing the transfer of the emotion data in response to requests by the applications. The emotion firewall is configured to determine whether to provide requested emotion data to a requesting application on the basis of the ruleset.

Still another embodiment provides a computer including a source of physiological data of a user, the physiological data having been collected by at least one input device interfacing with the use, and an emotion firewall. The emotion firewall is configured with an application programming interface defining a protocol for requesting the physiological data by applications; and a ruleset defining rules governing the transfer of the physiological data in response to requests by the applications. The emotion firewall is configured to determine whether to provide requested physiological data to a requesting application on the basis of the ruleset.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
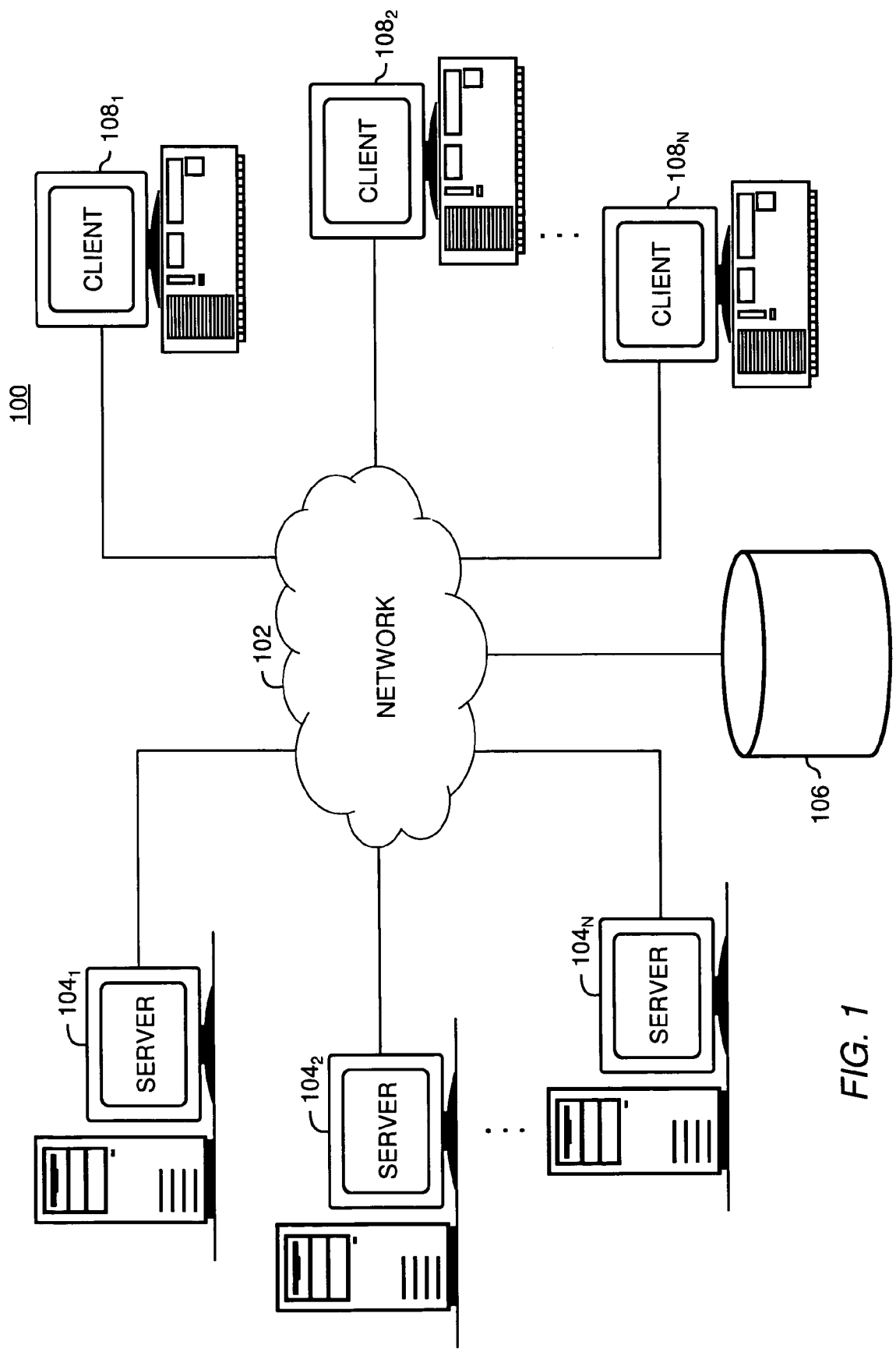
FIG. 1 is a high-level view of a networked client-server computer environment.

The present invention provides a method, the apparatus and article of manufacture for controlling the distribution of data that, e.g., characterizes a user's emotional state or is capable of being used to characterize the user's emotional state and/or describes a physiological parameter. A ruleset(s) is provided to regulate the distribution of the data to requesting applications. In order for an application to have access to the data, the relevant rules of the ruleset must be satisfied.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

In general, embodiments of the invention can be implemented in any of a variety of hardware/software configurations. A particular embodiment includes at least one client computer and at least one server computer. The client(s) and server(s) may be executing on a common machine or may be deployed in distributed environment in which the client(s) and server(s) communicate via a network (such as will be described below with respect to FIG. 1). However, the client-server model is merely one model in which the present invention may be implemented, and persons skilled in the art will recognize other possibilities. Furthermore, embodiments of the present invention can apply to any appropriate hardware configuration, regardless of whether the computer systems are complicated, multi-user computing apparatus, single-user workstations, network appliances that do not have non-volatile storage of their own or handheld devices such as personal digital assistants (PDAs), pocket PCs, and mobile telephones. Further, it is understood that while reference may be made to particular software products, the invention is not limited to a particular software product, standard or version, nor to any particular programming language. Accordingly, persons skilled in the art will recognize that the invention is adaptable to other software products and that the invention is also adaptable to future versions of a particular software product as well as to other suitable software products presently unknown.

With reference now to the figures, FIG. 1 depicts a pictorial representation of a distributed data processing system 100 (also referred herein as a network environment) in which the present invention may be implemented. The distributed data processing system 100 contains a network 102, which is the medium used to provide communications links between various devices and computers connected together within distributed data processing system 100. The network 102 may include permanent connections, such as wire or fiber optic cables, or temporary connections made through telephone connections and may also include wireless connections. Generally, the network 102 may be implemented as a number of different types of networks, such as, for example, an intranet, a local area network (LAN), or a wide area network (WAN). In a particular embodiment, the network 102 is the Internet.

In the depicted example, a plurality of computers is connected to the network 102. The computers include server computers 104 and client computers 108. The client computers 108 may be, for example, personal computers or network computers and the server computers 104 may be, for example, database servers or web servers. In this context the terms "server" and "client" merely denote a primary function of the respective computers. That is, client computers typically issue requests to the server computers, which then respond to the requests. However, it is possible, and in fact contemplated, that the server computers 104 issue requests to the client computers 108. Both the client computers and the server computers may each host one or more applications. In the case of the client computers, typical applications include word processors, e-mail clients, calendars, Web browsers, etc. In the case of the server computers, typical applications include database applications, web applications and any of a variety of transaction applications. It is also possible that a given machine hosts both server programs and client programs.

It is understood that FIG. 1 is merely illustrative. Thus, the distributed data processing system 100 may include other forms of server systems (not shown), which also provide data to the client computers. For example, one form of a server system may comprise two or more servers that have been logically associated with each other or interconnected as a cluster. The distributed data processing system 100 may include additional servers, clients, and other devices not shown. In any case, FIG. 1 is intended as an example, and not as an architectural limitation for the present invention.

Figure 2:
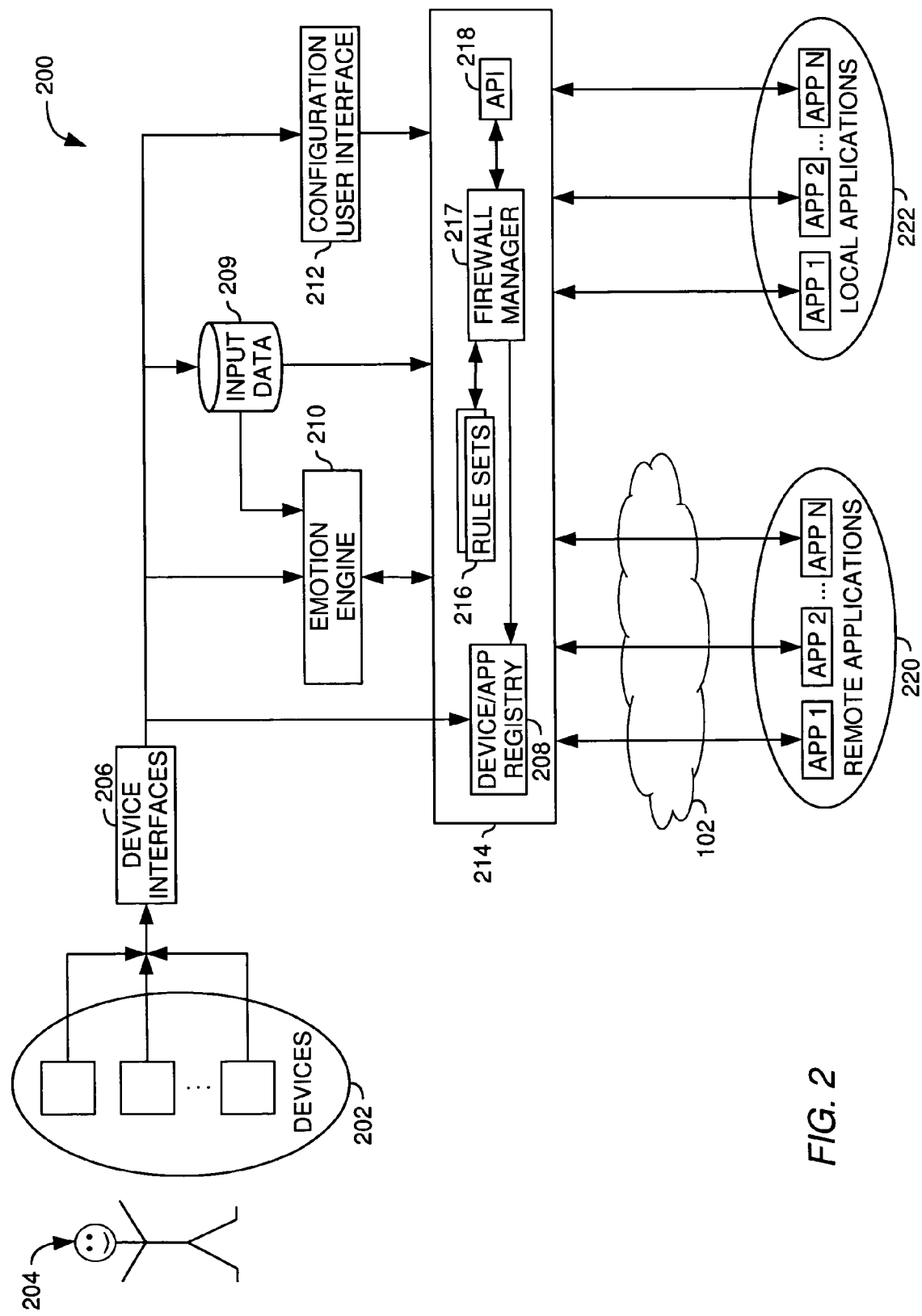
FIG. 2 is a block diagram illustrating an embodiment of a computer configured with an emotion firewall.

For purposes of illustration, aspects of the invention will be described with respect to one computer 200, shown in FIG. 2, which may be a client computer (e.g., the client computer $108_1$ of FIG. 1) or a server computer (e.g., the client computer $104_1$ of FIG. 1). The computer 200 is equipped with a plurality of input devices 202 (some or all of which are also capable of output). In general, the input devices 202 are adapted for receiving input from a human operator 204 (user) and providing the input to other components of the computer 200. In the context of the present invention, the input of interest is any input characterizing a physiological parameter of the human operator 204 and/or characterizing a manner of interaction between a particular input device and the human operator 204. Further, the input may be capable of being used to characterize the human operator's 204 emotional disposition. Examples of such input are provided below.

EXAMPLES OF INPUT DATA

Pulse
Eye movement
Brain activity
Body temperature
Blood pressure
Pressure of grip on mouse
Movement of mouse (erratic, smooth, consistent, etc.)
Typing speed
Typing patterns (erratic, smooth, consistent, etc.)
Typing pressure
Facial features
Perspiration Body Movement
To this end, illustrative input devices include a keyboard, keypad, light-pen, touch-screen, track-ball, a mouse, a speech recognition unit and a camera. The input devices 202 preferably also include sensory devices of the kind configured to sense one or more of the human operator's 204 physiological (e.g., physical, biological and/or chemical) attributes. For example, the sensory devices may include heart rate sensors, temperature sensors galvanic skin response sensors, pressure transducers and the like. The devices may also be implanted medical devices, such as implanted heart monitors. Non-limiting examples of specific devices are as follows:

Exemplary Input Devices
   IBM BlueEyes Project described at "http://www.almaden.ibm.com/cs/BlueEyes/index.html"
   IBM Research Emotion Mouse described at "http://www.i-ha.bepr.ethz.ch/pages/leute/zim/emopapers/ark-the emotion mouse.pdf"
   Grip-force detecting mouse described at "http://www.noldus.com/events/mb2000/program/abstracts/haan de.html"
   PlayStation® 2 EyeToy (emotion detector in future release) described at "http://www.eyetoy.com/english-findex.html"
   Eyelink II developed at Haskins Laboratories described at "http://www.haskins.vale.edu/haskins/MISC/Facilities/EyeMovement.html"
   Brain Activity During Simulated Deception described at "http://www.uphs.upenn.edu/trc/conditioning/neuroimage 15 2002.pdf"

The devices 202 may each be supported by the appropriate device interfaces 206. The device interfaces 206 include any combination of hardware and software, such as adapters and drivers, necessary for communication between the devices 202 and other components of the computer 200.

In one embodiment, each of the input devices 202 capable of providing input pertaining to a physiological parameter of the user 204 and/or that may be used to characterize an emotion or emotional state of the user 204 may be required to register with a registry 208. In the depicted embodiment, the registry 208 is shown as a component of an emotion firewall 214 (described in more detail below). However, the registry 208 may alternatively be, for example, a component of an operating system or application of the computer 108. Registering the input devices allows an emotion engine 210 and/or emotion firewall 214 (both described below) to determiner what raw data can be collected and/or disseminated. Additionally, registering the input devices allows for the configuration of data and parameters in the emotion firewall 214. For example, if a pulse measurement device is registered, then the emotion firewall 214 can provide this data to the user and can allow the user to use pulse measurements in the ruleset configuration (ruleset configuration is described below). In one embodiment, each of the registered devices is available to provide input to a data repository 209 in addition to the emotion engine 210 and/or emotion firewall 214. The data repository 209 may be any form of storage for temporarily or persistently storing input from the input devices 202. For example, the data repository 209 may be a data structure or a database. The emotion engine 210 is any hardware, software or combination of hardware and software configured to process the input provided by the registered devices (either directly or from the data repository 209) and characterize an emotion or emotional state of the user 204. The manner of such characterization may range from general to highly specific. For example, on the basis of input from the registered input devices 202 the emotion engine 210 may determine that the user 204 falls within a predefined "normal" emotion category, thereby providing only a broad emotional status characterization. Alternatively, on the basis of the same or different input, the emotion engine 210 may determine that the user 204 as angry, sad, happy, nervous, excited, or even make a more specific clinical psychological diagnosis such as manic-depressive. In any case, techniques for quantifying or qualifying a human being's emotions on the basis of human-computer interaction are well-known. Accordingly, any known or unknown techniques for characterizing a human being's emotions are contemplated, and further elaboration is not necessary.

For purposes of describing embodiments of the invention, the raw input data (e.g., input described in the EXAMPLES OF INPUT DATA table above) that may be provided to emotion engine 210 is referred to herein as "input data" and typically includes data that does not directly characterize an emotional attribute of the user 204. The output of the emotion engine 210 is referred to herein as "emotion data" and constitutes processed data characterizing an emotional attribute of the user 204. For convenience of description, input data and emotion data are collectively and separately referred to herein as "mood data", or just "data". Accordingly, it is understood that a reference to "mood data" refers to either or both input data and emotion data, unless specifically indicated otherwise.

For various purposes, the mood data may then be made selectively available to one or more applications upon request. Such applications generally include remote applications 220 and local applications 222. Remote applications 220 are remotely located applications communicating with the client computer 108 via a network 102. Local applications are those applications executing on the computer 200, or on some form of a local bus.

As noted, the bases for the applications' request of mood data may be varied. For example, in one embodiment a web application may be configured to determine the emotional reaction of visitors to a web site to determine whether certain content is offensive, confusing, funny, or interesting. Real-time messaging applications could be enriched by being able to automatically display emoticons representing each user's emotions during a messaging session, making interactions more expressive. In the gaming industry, artificial intelligence could use the mood data to configure a videogame differently depending upon, for example, whether the player is scared, surprised or angry. Marketers could measure the effectiveness of online advertisements, such as pop-ups, according to the emotional reaction of viewers. The foregoing are merely illustrative uses of mood data by applications. Persons skilled in the art will recognize other uses and it is understood that all such uses, known or unknown, are within the scope of the present invention.

While a variety of uses for the mood data are possible, the user 204 may find indiscriminate distribution of the mood data undesirable and prefer to exert some degree of control over the distribution. To this end, the computer 200 is configured with the emotion firewall 214 with which the emotion engine 210 communicates. It is contemplated that the emotion firewall 214 may be a standalone entity or incorporated into a particular application. In any case, the emotion firewall 214 is generally configured to regulate the transfer of the mood data output by the emotion engine 214. Specifically, the emotion firewall 214 responds to requests from various applications (e.g., applications 220, 222) for mood data and determines whether, and to what extent, the requests are complied with. In one embodiment, these functions are effected by configuring the emotion firewall 214 with one or more rulesets 216 and an application program interface (API) 218. In a multi-user environment different rulesets may be provided for each different user operating or accessing the computer. Such an embodiment may be particularly useful where the emotion firewall 214 resides on a central gateway computer providing access for a plurality of client computers (e.g., client computers 108 of FIG. 1) to the outside world. The rulesets 216 generally specify restrictions on the distribution of mood data. It is also contemplated that the rulesets 216 implement other aspects of control over the mood data, such as distortion of the mood data in order to mask or augment certain emotional attributes.

In a particular embodiment, a ruleset parameter includes "Application Type". That is, the rulesets 216 may implement restrictions on the distribution of the mood data according to the type of application requesting the emotion data. In this context, "Application Type" refers to a generic program category (e.g., messaging applications, word processors, browsers, etc.).

In another embodiment, a ruleset parameter includes "Specific Application". That is, the rulesets 216 may implement restrictions on the distribution of the mood data according to the specific application requesting the data, e.g., Lotus Development Corporation's Sametime®. Sametime® is a registered trademark of Lotus Development Corporation.

Another possible ruleset parameter is "Data Type", whereby the rulesets 216 may implement restrictions on the distribution of the mood data according to the particular type of the mood data being requested. For example, a specific data type ruleset parameter may specify that the emotion, anger, may not be provided to requesting applications.

Another possible ruleset parameter is "Data Value", whereby the rulesets 216 may implement restrictions on the distribution of the mood data according to the particular value of the emotion data being requested. For example, a specific data value ruleset parameter may specify that blood pressure readings may be provided to requesting applications only if the blood pressure reading has a value less than 140/90.

Another possible ruleset parameter is "Time of Day". Time of Day specifies a particular time or particular period of time during which the request(s) for mood data is received. For example, the ruleset may be configured to provide the requested data only if the request is received between 9 a.m. and 5 p.m.

Another possible ruleset parameter is "Application Priority". Application Priority specifies, for example, a relative priority of an application with respect to other applications. A requesting application could also classify the importance of its own requests in order to distinguish requests that are more important than others. For instance, an instant messaging application might request user A's emotion data every 3 minutes but would classify this as low priority. In contrast, the application may classify an explicit user request as a higher priority.

Another possible ruleset parameter is "Applications' Prior Requests". In one embodiment, this parameter is used in two ways: First, the parameter could be used in conjunction with Explicit User Authorization (See Table below). If the user denies a particular request multiple times, the emotion firewall could begin ignoring these specific requests altogether, rather than prompting the user each time. Second, the parameter could be used by the emotion firewall to identify surreptitious tactics. For instance, consider an application that is denied a request for "overall mood" but and then attempts to collect each individual raw data in order to construct the overall mood. This type of activity could set off a flag to the firewall to indicate suspicious intentions.

The foregoing ruleset parameter types, as well as additional parameter types, are provided in the table below.

TABLE

ILLUSTRATIVE RULESET PARAMETERS

| PARAMETER TYPE | DESCRIPTION |
| --- | --- |
| Application Type | Specifies particular application types, e.g., messaging application, web applications, etc. |
| Specific Application | Specifies specific application, e.g., Sametime ®. |
| Connection Type | Specifies the type of connection between applications or devices, e.g., secure or insecure. |
| Mood/Data Type | Specifies the specific type of mood data, e.g., angry, sad, blood pressure, etc. |
| Data Value | Specifies a specific value for a specific mood type, e.g., a blood pressure reading 140/80. |
| Requester/Recipient | Specifies a specific user or group of users requesting the mood data, e.g., John Smith or Group 1 (which is defined to include selected family members, for example). Also may include IP address and/or domain. |
| Time of Day | Specifies a particular time or particular period of time during which the request(s) for mood data is received. |
| Confidence Level | Specifies a degree of perceived confidence in the accuracy of particular emotion data output by the emotion |

TABLE-continued

ILLUSTRATIVE RULESET PARAMETERS

| PARAMETER TYPE | DESCRIPTION |
| --- | --- |
| | engine. |
| Application Priority | Specifies relative priority of an application with respect to itself or other applications. |
| Explicit user Authorization | Specifies that an explicit user action is required to release the requested data, e.g., clicking "OK" button in a dialog box that is presented to the user after the request for data is received. |
| Applications' Prior Requests | Used to handle reoccurring requests and used to identify "hacking". |
| Credibility Level | Specifies a credibility level of the application that may be assigned by a third party or a user. |

The foregoing ruleset parameter types are merely illustrative, and persons skilled in the art will recognize other parameter types. Further, is contemplated that a given ruleset may define rules based on a combination of different parameter types. For example, a specific ruleset may specify that blood pressure readings may be provided only to an authenticated health monitoring application. Another ruleset may specify that the emotion, anger, may only be provided to messaging applications where the users of the messaging applications are John Smith and Janet Smith.

Figure 3:
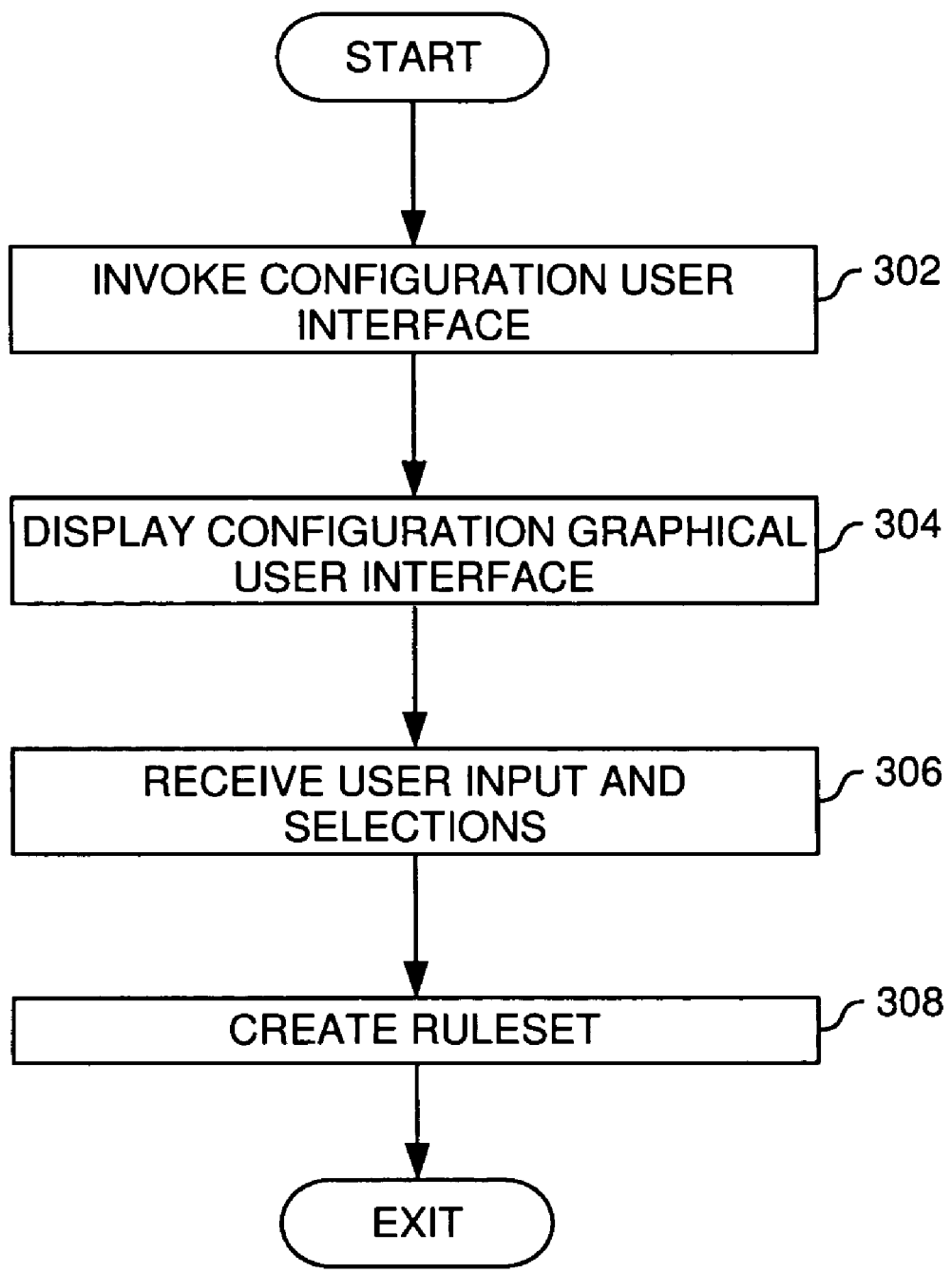
FIG. 3 is a flow chart illustrating one embodiment for configuring a ruleset of the emotion firewall of FIG. 2.

In one embodiment, the rulesets 216 are user configurable through a configuration user interface 212. The user interface 212 may be, for example, a graphical user interface providing the user with a rich environment of features and functions (e.g., menus, buttons, wizards, etc.) facilitating configuration of the rulesets 216. Referring briefly to FIG. 3, a flowchart illustrating one method 300 for creating a ruleset is shown. The user 204 desiring to create a ruleset first invokes the configuration user interface 212 (step 302), such as by double-clicking on the appropriate icon of a desktop environment. The configuration user interface 212 is then displayed to the user 204 (step 304) who can then make the desired selections using input devices (e.g. the input devices 202 of the computer 200 shown in FIG. 2). Illustrative selections include specifying any of the ruleset parameters given in the TABLE above. The selections are received (step 306) and applied to create the appropriate ruleset (step 308).

It is also contemplated that the ruleset 216 may be configured by an application or an operating system. For example, using the API, an application could set up particular rules upon installation. Accordingly, when a program such as Instant Messaging is installed, the application could set up basic default rulesets.

Having configured the ruleset 216, the ruleset 216 can then be applied to incoming requests from the remote applications 220 and the local applications 222. In one embodiment, the ruleset 216 is applied by a firewall manager 217. Specifically, on the basis of the ruleset 216, the firewall manager 217 determines whether requested mood data will be provided to the requesting application. In one embodiment, the firewall manager 217 is a software component that receives requests compliant with the API 218 and then accesses the ruleset 216 to determine whether the applicable rules are satisfied. To this end, the API 218 defines an appropriate protocol for requesting mood data. The API protocol may define, for example, the type of information that can be exchanged between the firewall 214 and a requesting application. For example, the API 214 may allow applications to request (i) emotion data, i.e., information characterizing the user's 204 emotion(s) as determined by the emotion engine 210; (ii) a confidence level in a particular emotion data (as defined above in the TABLE); and (iii) a specific physiological parameter (e.g., blood pressure readings). The API 214 may also allow, or require, applications to specify a priority level (as defined above in the TABLE) and/or specific requester information such as the requesting user (e.g., John Smith) and the type of application. In one embodiment, the API 214 implements the registration of the input devices 202 with the emotion firewall 214. Of course, the foregoing aspects of the API 214 are merely illustrative and persons skilled in the art will recognize other aspects which may be implemented.

Figure 4:
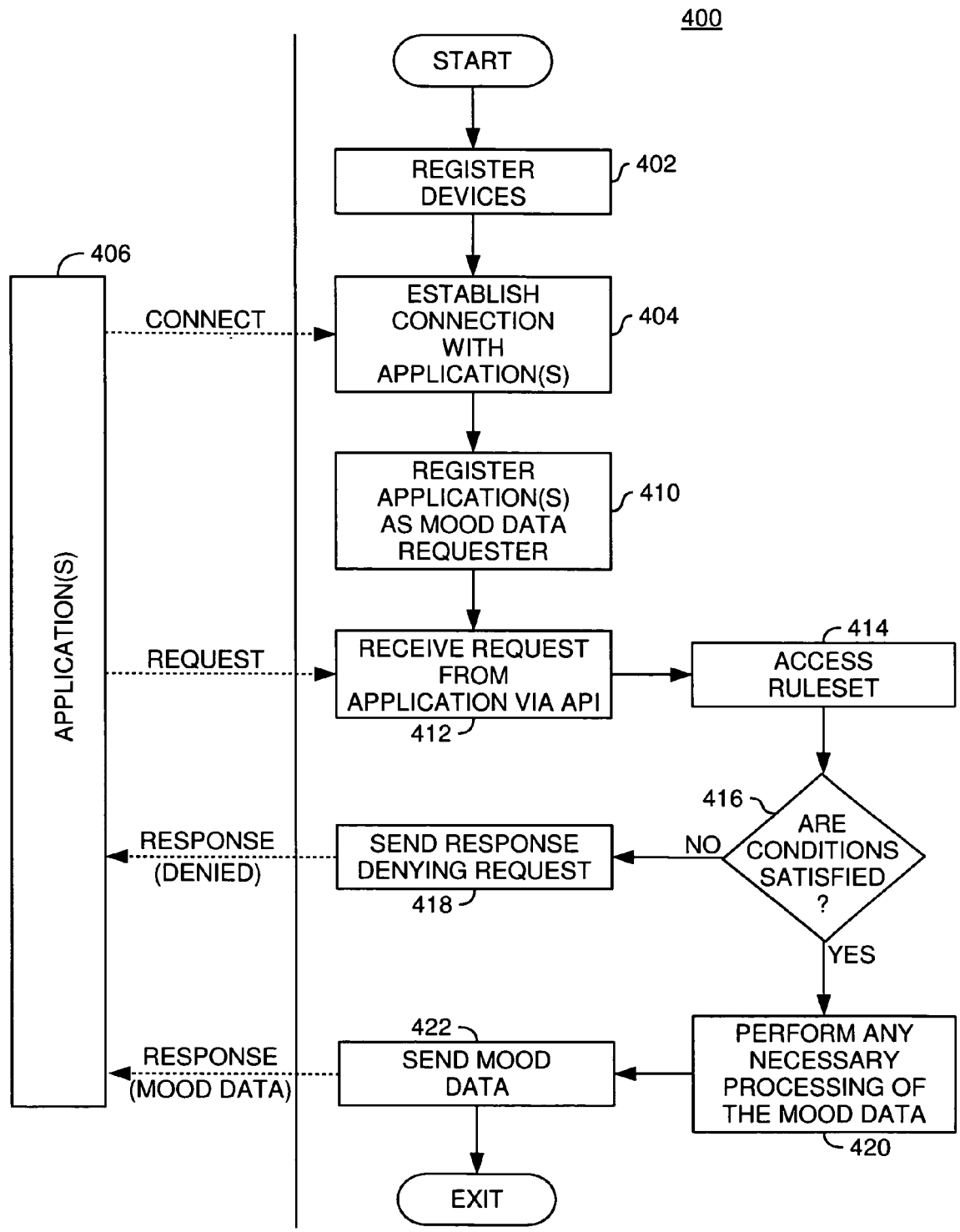
FIG. 4 is a flow chart illustrating one embodiment for operating the emotion firewall in response to requests from applications for mood data.

Referring now to FIG. 4, a flow chart of a method 400 is shown illustrating one embodiment for operating the computer $108_1$, after the firewall 214 is configured with one or more appropriate rulesets 216. For illustration, the method 400 is assumed to start when the computer $108_1$ is powered up and initiates a boot sequence, but may also be entered at other times after booting up. At step 402, the input devices 202 are registered with the registry 208. Registration of the input devices 202 may occur, for example, during initialization of the devices. At step 404, a connection is established with one or more requesting applications 406 (e.g., any of the remote applications 220 and/or local applications 222). It is contemplated that the connection maybe made, according to the API 218, through a dedicated port or an existing port. In one embodiment, each requesting application is registered (e.g., with the registry 208) as a mood data requester, at step 410. The emotion firewall 214 then begins receiving requests (at step 412) from the applications 406, wherein the requests conform to the API 218. For a given received request, the firewall manager 217 accesses (at step 414) the appropriate ruleset 216. The firewall manager 217 then determines (at step 416) whether the conditions of the ruleset 216 are satisfied. In this context, a determination that the ruleset conditions are "satisfied" only ensures that some form of mood data will be provided to the requesting application, not that the particular mood data being requested will be provided. For example, it was noted above that the ruleset 216 may specify some form of distortion or control be implemented with respect to the mood data being provided to the requesting application. An example of control in this regard is restricting the mood data provided to the requesting application to a subset of the data being requested. Accordingly, the firewall manager 217 performs any necessary processing of the mood data (at step 418) prior to sending the mood data (at step 420) to the requesting application. If, however, the ruleset conditions are not satisfied (at step 416), then no form of mood data will be provided to the requesting application and the firewall manager 217 sends a response (at step 418) denying the request.

The foregoing describes embodiments of an emotion firewall for regulating the transmission of mood data to requesting applications. As such, the emotion firewall may be considered a middleware product residing between a source of the mood data and the requesting applications. While particular embodiments have been described, the invention is not limited to these embodiments and persons skilled in the art will recognize other embodiments within the scope of the invention. For example, FIG. 2 shows an emotion engine 210 residing "behind" the emotion firewall 214. However, it is contemplated that the emotion engine 210 may alternatively be on the other side of the firewall, e.g., residing on a remote server such as the server computer 104, shown in FIG. 1. Embodiments are also contemplated in which no emotion engine is provided, and the emotion firewall 214 regulates only the transmission of "raw" data such as physiological data including blood pressure, pulse, etc. Persons skilled in the art will recognize still other embodiments.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving, from a requesting application, a request for emotion data characterizing an emotional state of a user, wherein the requesting application is of a particular type;
    accessing a firewall ruleset defining rules governing the transfer of the emotion data to requesting applications, wherein at least some of the rules of the firewall ruleset each specify a different application type selected from a plurality of application types;
    determining whether to provide the emotion data to the requesting application; wherein determining comprises:
        locating each rule in the firewall ruleset that includes a parameter specifying the particular type of the requesting application; and
        determining whether the located rules are satisfied; whereby the rules are applied to each requesting application according to its respective application type; and
    denying the request if the firewall ruleset rules are not satisfied.

2. The method of claim 1, providing the requested emotion data to the requesting application if the firewall ruleset rules are satisfied.

3. The method of claim 1, providing only a portion of the requested emotion data to the requesting application if the firewall ruleset rules are satisfied.

4. The method of claim 1, wherein the emotional state characterized by the emotion data is one of angry, sad, happy, excited, nervous, interested and any combination thereof.

5. The method of claim 1, wherein the emotional state characterized by the emotion data is any calculable human emotion.

6. The method of claim 1, wherein the firewall ruleset is configurable by the user.

7. The method of claim 1, wherein the requesting application is a web-based application and the request is received via the Internet.

8. The method of claim 1, wherein the emotion data is based on measurements of physiological parameters.

9. The method of claim 8, wherein the measurements of physiological parameters, comprise at least one of blood pressure, pulse and galvanic skin response.

10. The method of claim 8, wherein the measurements of physiological parameters, comprise measurements of brain wave activity of the user.

* * * * *